United States Patent
Solarz (10) Patent No.: US 10,174,850 B2
(45) Date of Patent: Jan. 8, 2019

(54) CHECK VALVES

(71) Applicant: HS Wroclaw Sp. z o. o., Wroclaw (PL)

(72) Inventor: Bartosz Solarz, Otmuchow (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/947,083

(22) Filed: Nov. 20, 2015

(65) Prior Publication Data

US 2016/0146361 A1    May 26, 2016

(30) Foreign Application Priority Data

Nov. 20, 2014  (EP) ..................................... 14461589

(51) Int. Cl.
*F16K 15/03*    (2006.01)
*F16K 27/02*    (2006.01)

(52) U.S. Cl.
CPC ............ *F16K 15/03* (2013.01); *F16K 15/038* (2013.01); *F16K 27/0218* (2013.01)

(58) Field of Classification Search
CPC ..... F16K 27/0218; F16K 15/03; F16K 15/038
USPC ..................... 137/512, 512.1, 527
See application file for complete search history.

(56) References Cited

U.S. PATENT DOCUMENTS

| 2,781,054 | A | * | 2/1957 | Gerhard | ................. F16K 15/03 |
| | | | | | 137/527.8 |
| 2008/0072973 | A1 | * | 3/2008 | McGonigle | ............ B64D 13/02 |
| | | | | | 137/512.1 |
| 2009/0056818 | A1 | | 3/2009 | McGonigle et al. | |
| 2010/0282340 | A1 | * | 11/2010 | Dehais | ................. F16K 15/038 |
| | | | | | 137/511 |
| 2013/0019966 | A1 | | 1/2013 | Hawa | |

FOREIGN PATENT DOCUMENTS

DE    102007057663 A1    6/2009

OTHER PUBLICATIONS

European Search Report for Application No. 14461589.5-1751 dated Apr. 30, 2015. 5 pages.

* cited by examiner

*Primary Examiner* — Kevin Lee
*Assistant Examiner* — P. Macade Nichols
(74) *Attorney, Agent, or Firm* — Cantor Colburn LLP (57) ABSTRACT

A check valve comprises a valve housing defining a valve opening. A pair of mounting posts is arranged on opposite sides of the opening. A pair of flapper elements is pivotably mounted for rotation between an open position and a closed position. The flapper elements are mounted to hinge pins mounted to respective mounting posts. A base portion of the hinge pins is formed with a sleeve having a bore which is slidably mounted on a hinge pin mounting portion of a respective mounting post.

20 Claims, 6 Drawing Sheets

CHECK VALVES

FOREIGN PRIORITY

This application claims priority to European Patent Application No. 14461589.5 filed Nov. 20, 2014, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

It is has been found that in order to achieve good sealing between the flapper elements and the valve housing and also to reduce wear on opening, some vertical lift off of the flapper elements from the valve housing prior to rotation may be desirable.

The present disclosure relates to a check valve which allows for such movement.

SUMMARY

From one aspect, there is disclosed herein a check valve comprising a valve housing defining a valve opening, a pair of mounting posts arranged on opposite sides of the opening and a pair of flapper elements pivotably mounted for rotation between an open position and a closed position. The flapper elements are mounted to at least one hinge pin mounted to one or more of the mounting posts. An end region of the or each hinge pin is formed with a sleeve portion having a bore which is slidably mounted on a hinge pin mounting portion of a respective mounting post.

Thus in embodiments disclosed herein, lift-off movement of the flapper elements may be permitted by movement of hinge pins supporting the flapper elements along the mounting posts. Bores formed on the hinge pins are slidably received on the mounting posts.

In various embodiments, the check valve comprises a first hinge pin mounted to a first mounting post and a separate second hinge pin mounted to a second mounting post.

In some embodiments, the first and second hinge pins are not connected.

In alternative embodiments, however, the first and second hinge pins are connected so as to extend between the mounting posts.

In such arrangements, the first and second hinge pins may be fixedly connected together, for example by brazing, welding, gluing after assembly or by an interference fit during assembly.

In other embodiments, however, the first and second hinge pins may be connected together so as to allow relative movement, for example axial movement, of the hinge pins.

In embodiments, the ends of the hinge pins remote from the mounting posts may be provided with interengaging formations, such as a socket and a spigot engaging in the socket, to facilitate their alignment. The spigot may be slidable within the socket, or fixed therein by any of the aforementioned methods.

In alternative embodiments to the above, a single hinge pin may be provided extending between the mounting posts.

In various embodiments, the hinge pin mounting portion of the mounting post may be formed with a shoulder to limit movement of the hinge pin there along. Moreover, in embodiments, the mounting post may be formed with a post mounting portion extending through and secured to the valve housing, the hinge pin mounting portion of the mounting post being defined between the valve housing and the shoulder.

In various embodiments, the check valve may comprise a stop bar mounted to or formed integrally with said mounting posts and extending across the opening for engagement with the flapper elements in their open position. Alternatively, each mounting post may be formed with stop surfaces for engaging respective edge regions of the flapper elements in their open position.

In various embodiments each flapper element may have two or more mounting lugs, one adjacent a first side of the flapper element and another inwardly spaced from the other side of the flapper element. In some embodiments, each flapper element may have only two mounting lugs.

The sleeve portion of the hinge pin(s) may be formed with a stop surface for engaging the respective flapper element mounting lug adjacent the side of the flapper element so as to prevent contact of the flapper elements with the mounting posts.

In embodiments, the bore provided in the hinge pin, and the hinge pin mounting portion of the mounting post, are circular in cross section, although other, non-circular cross sections, for example non-circular complementary cross sections, are also possible within the scope of this disclosure.

Some embodiments of the disclosure will now be described by way of example only.

DETAILED DESCRIPTION

Figure 1:
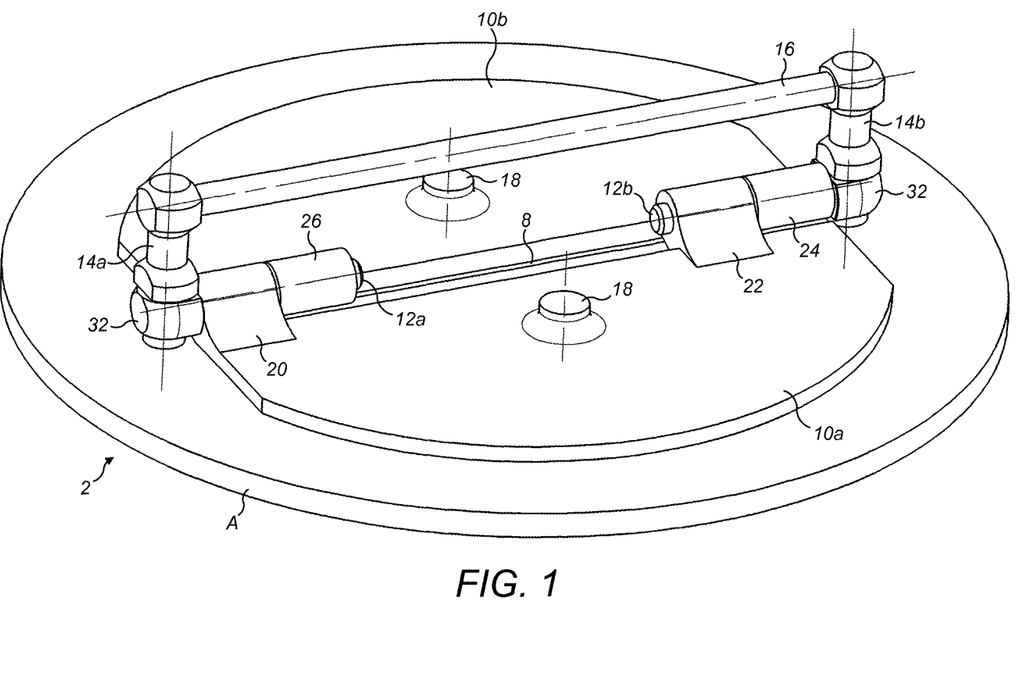
FIG. 1 shows a perspective view of a first embodiment of check valve in accordance with this disclosure, in a closed configuration.
Figure 2:
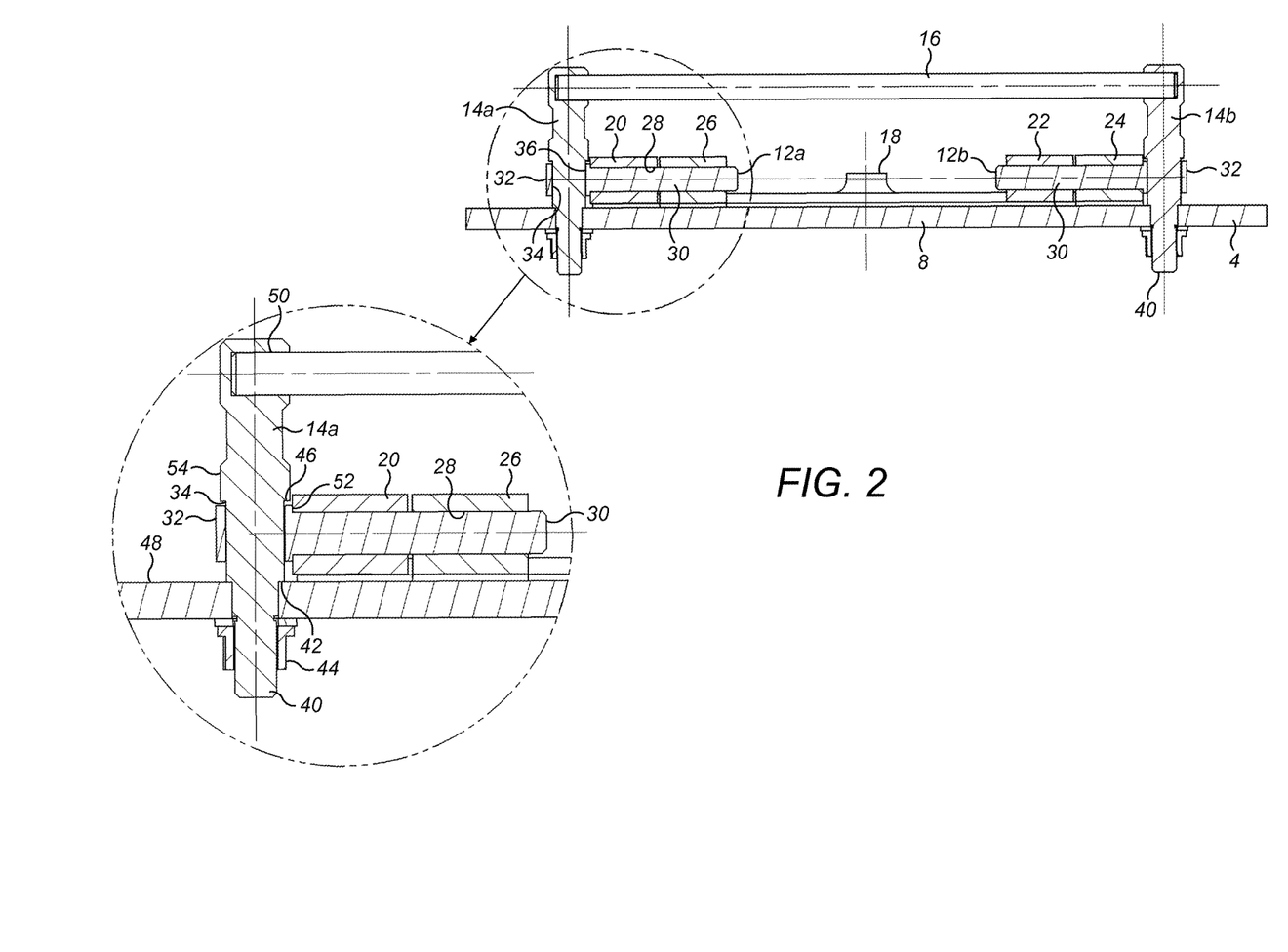
FIG. 2 shows a vertical section through the check valve of FIG. 1.

With reference to FIGS. 1 and 2, a first embodiment of check valve 2 in accordance with this disclosure is illustrated.

The check valve 2 comprises a valve housing 4. The valve housing 4 defines an opening 6 therethrough in the form of two generally D-shaped apertures (see FIG. 4) separated by a central web 8 of the valve housing 4. The opening is closed by a pair of generally D-shaped flapper elements 10a, 10b.

The flapper elements 10a, 10b are mounted to first and second hinge pins 12a, 12b which are in turn mounted to mounting posts 14a, 14b which extend upwardly from the valve housing 4 on opposed sides of the valve opening 6.

The hinge pins 12a, 12b, may, advantageously, have the same shape and size as each other so as to facilitate and reduce the cost of manufacture. Similarly the mounting posts 14a, 14b, may, advantageously, have the same shape and size as each other.

A stop bar 16 is mounted to an upper end of the mounting posts 14a, 14b to extend across the valve opening 6 and arranged so as to engage stops 18 provided on the flapper elements 10a, 10b when the flapper elements 10a, 10b have moved to their fully open position.

Turning now in more detail to the mounting of the flapper elements 10a, 10b, flapper element 10a comprises first and second mounting lugs 20, 22, with first mounting lug 20 being arranged at one edge of the flapper element 10a and second mounting lug 22 being arranged inwardly from the opposite edge of the flapper element 10a. Similarly, flapper element 10b comprises a first mounting lug 24 arranged adjacent one edge of the flapper element 10b and a second mounting lug 26 arranged inwardly from the opposite edge of the flapper element 10b. As will be seen, when mounted, the first mounting lug 20 of the flapper element 10a is arranged between the second mounting lug 26 of the flapper element 10b and the mounting post 14a and the first mounting lug 24 of the flapper element 10b arranged between the second mounting lug of the flapper element 10a and the opposite mounting post 14b. In this example only a single mounting lug is provided on each side of each flapper element 10a, 10b, although more lugs could be provided.

Each mounting lug 20, 22, 24, 26 has a bore 28 through which a cylindrical portion 30 of the respective hinge pins 12a, 12b extend.

The respective hinge pins 12a, 12b are each provided with an end or base portion 32 for mounting the hinge pin to the respective mounting post 14a, 14b. The base portion 32 is in the form of a sleeve, with a bore 34 which is received over a hinge pin mounting portion 36 of the hinge pin 14a, 14b. The bore 34 is sized so as to permit the respective hinge pin 12a, 12b to slide vertically up and down the hinge pin mounting portion 36 of the hinge pin 14a, 14b. Typically a clearance of about 1 mm may be provided between the bore 34 and the mounting portion 36 of the hinge pins 14a, 14b.

In this embodiment, the bore 34 and hinge pin mounting portion 36 are circular in cross-section, as this may facilitate manufacture, but other, non-circular cross sections, for example non-circular complementary cross sections may be used in accordance with the disclosure.

In this embodiment, each mounting post 14a, 14b is formed as a separate element from the valve housing 4. The mounting posts 14a, 14b each comprise a post mounting portion 40 which extends through the valve housing 4, with a shoulder 42 limiting the movement of the mounting post 14a, 14b through the valve housing 4. The mounting post 14a, 14b is held in place by a suitable fastener, for example a nut and washer 44 as shown, although any other suitable type of fastening may be used.

The hinge pin mounting portion 36 of the mounting post 14a, 14b is provided with a shoulder 46 at its upper end to limit the upward movement of the hinge pin 12a, 12b along the hinge pin mounting section 36. Thus the hinge pin mounting portion 36 is defined between the shoulder 46 and the upper surface 48 of the valve housing 4.

As seen in FIG. 2, the stop element 16 is received in bores 50 provided at the upper end of each mounting post 14a, 14b. The stop element 16 will be mounted to the respective mounting posts 14a, 14b prior to their insertion through the valve housing 4. It will be understood that while in this embodiment the stop bar 16 is shown as a separate element from the mounting posts 14a, 14b, in other embodiments the stop bar 16 may be made integral therewith.

It will also be noted from FIG. 2 that the sleeve portion 32 of each hinge pins 12a, 12b is provided with a shoulder 52 which projects inwardly of the overlying portion 54 of the adjacent mounting post 14a, 14b. This shoulder 52 will act as a stop for the mounting lugs 20, 24, preventing them from coming into contact with the mounting posts 14a, 14b, avoiding any frictional wear on the mounting posts 14a, 14b or the mounting lugs 20, 24.

In use, when the valve 2 is closed, the flapper elements 10a, 10b will be firmly seated against the valve housing 4 to close the openings 6 in the valve housing 4. When a pressure differential is applied in a valve opening direction, the flapper elements 10a, 10b will not only be able to rotate about the cylindrical portion 30 of the hinge pins 12a, 12b, but the hinge pins 12a, 12b will be able to slide vertically up the hinge pin mounting portions 36 of the mounting posts 14a, 14b. This will allow for initial lift off of the flapper elements 10 from the valve housing 4.

Having two, disconnected hinge pins 12a, 12b will permit the above movements and at the same time facilitate alignment of the hinge pins 12a, 12b and flapper elements 10 and mounting posts 14. Also, since the hinge pins 12a, 12b are separately moveable when relative to the other, clearances in the respective connections between the hinge pins 12a, 12b and the mounting posts 14 can be made relatively tight.

In this embodiment, the hinge pins 12a, 12b and the mounting posts 14a, 14b are of the same shape and size, for ease of manufacture. Also, their shape and construction may further facilitate manufacture. For example, the hinge pins 12, due to their relatively short length may be manufactured using a standard lathe. Moreover, the mounting posts 14, comprising in effect a series of cylindrical portions, may also be turned on a lathe, without multi-axis milling.

It will also be understood that due to the relatively short length of the hinge pins 12 and the relatively slim mounting post design, the overall weight of a check valve may be reduced, which is advantageous particularly in aircraft applications.

Figure 3:
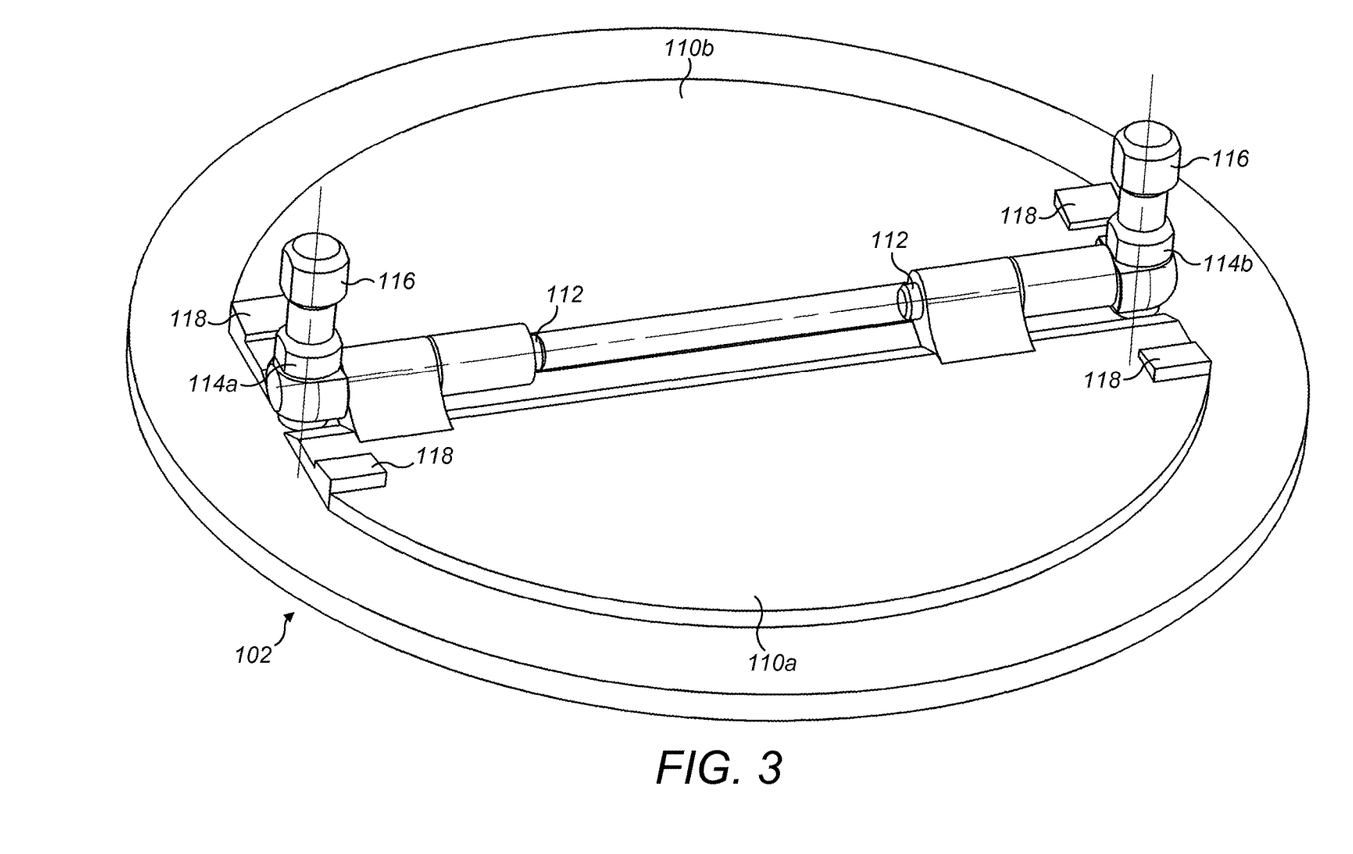
FIG. 3 shows a perspective view of a second embodiment of check valve in accordance with this disclosure, in a closed configuration.
Figure 4:
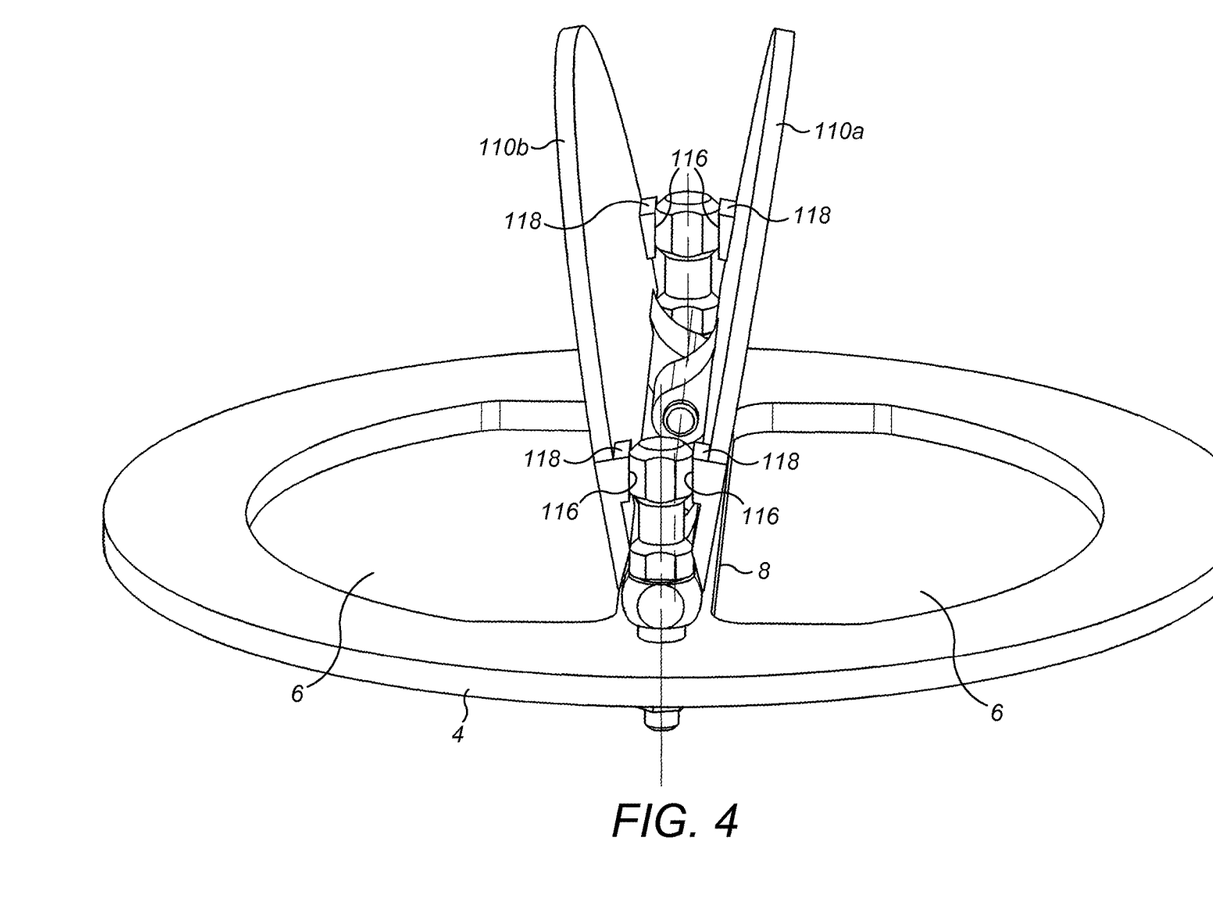
FIG. 4 shows the check valve of FIG. 3 in an open configuration.

With reference now to FIGS. 3 and 4, a second embodiment of check valve 102 in accordance with this disclosure is illustrated.

The check valve 102 illustrated in FIGS. 3 and 4 is generally similar to that of the embodiment of FIGS. 1 and 2, so only the differences between the two constructions will be discussed.

In the check valve 2 described above, a stop bar 16 is mounted between the mounting posts 14a, 14b for engagement with stops 18 on the flapper elements 10a, 10b. In this embodiment, however, the stop bar 16 has been removed and the flapper elements 110a, 110b extended outwardly so as to overlap the mounting posts 114a, 114b. Edge regions of the flapper elements 110a, 110b are provided with respective stop elements 118 which, when the valve is in its open configuration, engage stop portions 116 formed by the upper ends of the mounting posts 114a, 114b. As can be seen from FIG. 4, when the valve is open, the stop elements 118 engage the stop portions 116 of the mounting posts 114a, 114b with a line contact.

This embodiment has the potential advantage of obviating the need for a stop bar 16, which may lead to weight reduction in the valve construction.

Figure 5:
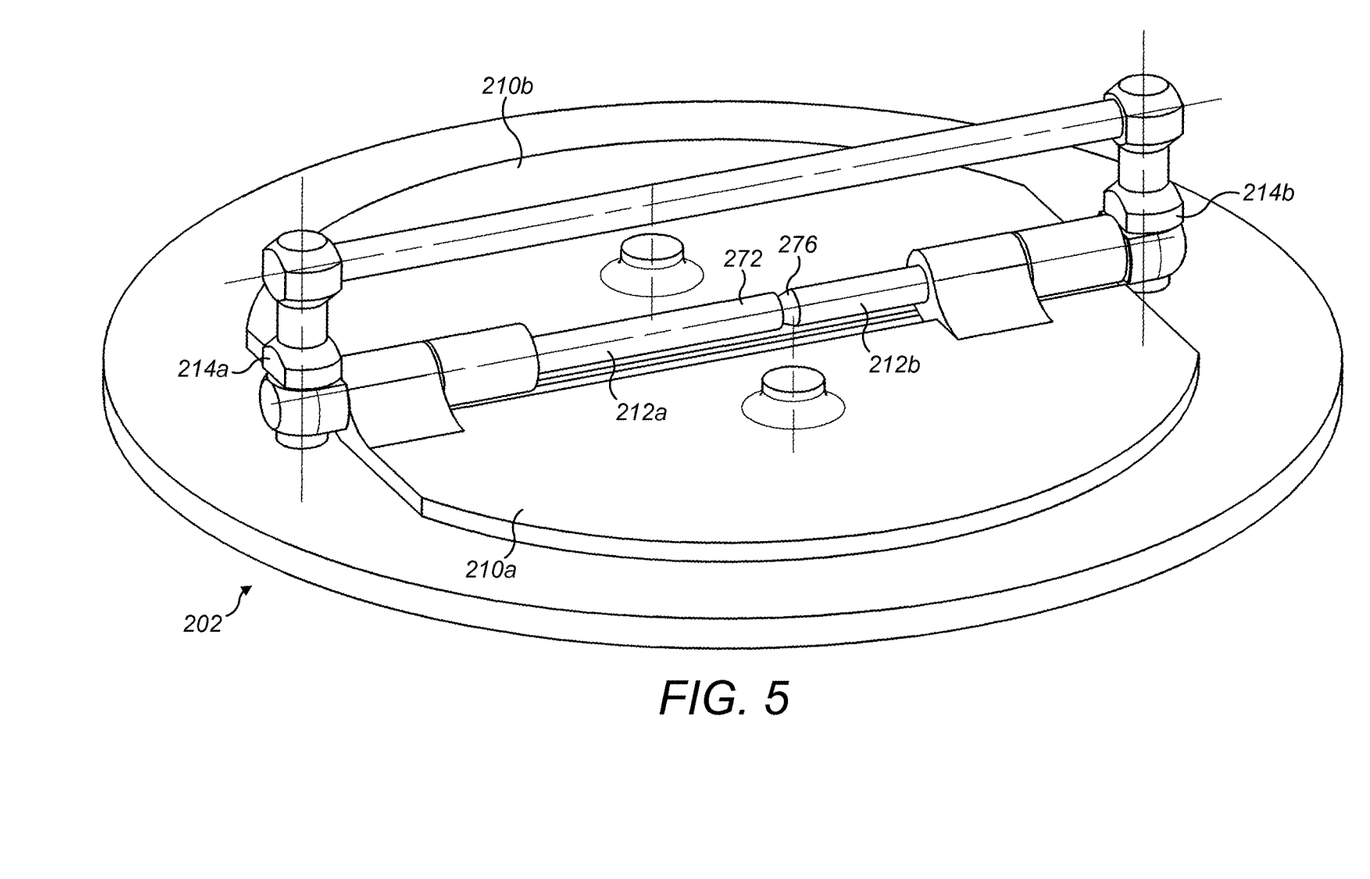
FIG. 5 shows a perspective view of a third embodiment of check valve in accordance with the disclosure, in a closed condition.
Figure 6:
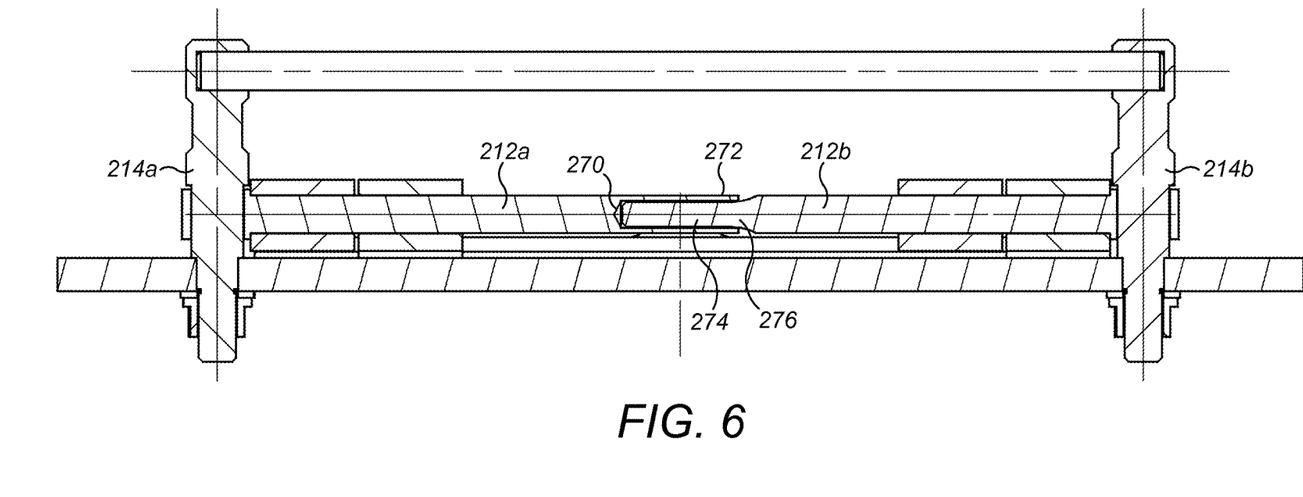
FIG. 6 shows a vertical cross-section through the check valve of FIG. 5.

Turning now to FIGS. 5 and 6, a third embodiment of check valve 202 in accordance with this disclosure is illustrated. This embodiment is again generally similar to the embodiment of FIGS. 1 and 2 and differs only in the form of the hinge pins.

In this embodiment, the respective hinge pins 212a, 212b are longer than those of the earlier embodiments. One of the hinge pins 212a is formed with a socket 270 at its end 272 opposite mounting post 214a. Similarly, hinge pin 212b is formed with a spigot 274 at its end 276 opposite the other mounting post 214b. The spigot 274 and socket 270 assist in alignment of the hinge pins 212a, 212b.

In one embodiment, the spigot 274 may be slidably received within the socket 270.

In this embodiment, the hinge pins 212a, 212b are able to move axially relative to each other due to the sliding engagement of the spigot 274 within the socket 270. This may facilitate alignment of the hinge pins 212a, 212b and their engagement with the mounting posts 214a, 214b.

In other embodiments, however, the hinge pins 212a, 212b may be fixedly attached to one another after assembly, for example by welding, brazing or gluing, or by an interference fit during assembly. Thus, for example, spigot 274 may be brazed, welded or glued into the socket 270.

It will be understood that the above description is of some specific embodiments of the disclosure and that modifications may be made to these embodiments without departing from the scope of the disclosure. For example in some embodiments, a single piece hinge pin may be mounted between the mounting posts.

Also, other forms of interengagement may be provided between the hinge pins 212a, 212b.

The invention claimed is:

1. A check valve comprising:
   a valve housing defining a valve opening;
   a pair of mounting posts arranged on opposite sides of said opening; and
   a pair of flapper elements pivotably mounted for rotation between an open position and a closed position;
   said flapper elements being mounted to at least one hinge pin mounted to one or more of said mounting posts, a base portion of said hinge pin being formed with a sleeve having a bore which is slidably mounted on a hinge pin mounting portion of a respective mounting post.

2. The check valve according to claim 1, comprising a first hinge pin mounted to a first mounting post and a separate second hinge pin mounted to a second mounting post.

3. The check valve according to claim 2, wherein said first hinge pin and said second hinge pin are not connected.

4. A check valve comprising:
   a valve housing defining a valve opening;
   a pair of mounting posts arranged on opposite sides of said opening;
   a pair of flapper elements pivotably mounted for rotation between an open position and a closed position, said flapper elements being mounted to at least one hinge pit mounted to one or more of said mounting posts, a base portion of said hinge pin being formed with a sleeve having a bore which is slidably mounted on a hinge pin mounting portion of a respective mounting post; and
   a first hinge pin mounted to a first mounting post and a separate second hinge pin mounted to a second mounting post, wherein said first hinge pin and said second hinge pin are connected so as to extend between said mounting posts.

5. The check valve according to claim 4, wherein said first and second hinge pins are fixedly connected together.

6. The check valve according to claim 4 wherein said first and second hinge pins are connected so as to allow relative axial of the hinge pins.

7. The check valve according to claim 5 wherein an end of said first hinge pin remote from one mounting post is formed with a socket and the end of said second hinge pin remote from the other mounting post is formed with a spigot engaging said socket.

8. The check valve according to claim 6 wherein an end of said first hinge pin remote from one mounting post is formed with a socket and an end of said second hinge pin remote from the other mounting post is formed with a spigot engaging said socket.

9. The check valve according to claim 1, comprising a single hinge pin extending between and mounted to both mounting posts.

10. The check valve according to claim 1, wherein said hinge pin mounting portion of said mounting post is formed with a shoulder to limit movement of said hinge pin thereabout.

11. The check valve according to claim 10, wherein each mounting post is formed with a post mounting portion extending through and secured to the valve housing, said hinge pin mounting portion of said mounting post being defined between said valve housing and said shoulder.

12. The check valve according to claim 1, further comprising a stop bar mounted to, or formed integrally, with said mounting posts and extending across the opening for engagement with the flapper elements in their open position.

13. The check valve according to claim 1, wherein each mounting post is formed with stop surfaces for engaging stops provided in respective edge regions of said flapper elements in their open position.

14. The check valve according to claim 1, wherein each flapper element has two or more mounting lugs for mounting said flapper element to said hinge pin(s), one mounting lug adjacent a first side of the flapper element and another mounting lug inwardly spaced from the other side of the flapper element.

15. The check valve according to claim 14, wherein the sleeve of the hinge pin is formed with a stop surface for engaging said flapper element mounting lug adjacent the side of the flapper element so as to prevent contact of said flapper element with the adjacent mounting post.

16. The check valve as claimed in claim 1, wherein said bore provided in said hinge pin sleeve, and said hinge pin mounting portion of said mounting post, are circular in cross section.

17. A check valve comprising:
   a valve housing defining a valve opening;
   a pair of mounting posts arranged on opposite sides of said opening;
   a pair of flapper elements pivotably mounted for rotation between an open position and a closed position,
   wherein said pair of flapper elements being mounted to at least one hinge pin mounted to one or more of said mounting posts, a base portion of said hinge pin being formed with a sleeve having a bore which is slidably mounted on a hinge pin mounting portion of a respective mounting post; and a first hinge pin mounted to a first mounting post and a separate second hinge pin mounted to a second mounting post, wherein said first hinge pin and said second hinge pin are connected so as to extend between said mounting posts.

18. The check valve according to claim 17, wherein said first and second hinge pins are fixedly connected together.

19. The check valve according to claim 17, wherein said first and second hinge pins are connected so as to allow relative axial movement of the hinge pins.

20. The check valve according to claim 17, wherein an end of said first hinge pin remote from one mounting post is formed with a socket and an end of said second hinge pin remote from the other mounting post is formed with a spigot engaging said socket.

\* \* \* \* \*